United States Patent [19]  [11] 4,271,527
Armstrong  [45] Jun. 2, 1981

[54] DOUBLE SIDE BAND-QUADRATURE CARRIER MODULATION SIGNAL STRUCTURES

[75] Inventor: Thomas R. Armstrong, Largo, Fla.
[73] Assignee: Paradyne Corporation, Largo, Fla.
[21] Appl. No.: 71,734
[22] Filed: Aug. 31, 1979
[51] Int. Cl.³ .............................................. H04L 3/00
[52] U.S. Cl. ......................................... 375/39; 375/53
[58] Field of Search ...................... 375/39, 53, 56, 34, 375/40, 50, 67, 83, 84, 85, 86, 100

[56] References Cited
U.S. PATENT DOCUMENTS 3,887,768  6/1975  Forney, Jr. et al. ................... 375/56
3,983,485  9/1976  Stuart .................................... 375/53
4,135,057  1/1979  Bayless, Sr. et al. ................. 375/53

Primary Examiner—Thomas A. Robinson
Attorney, Agent, or Firm—Gerald Levy

[57] ABSTRACT

An improved method is provided for the complex plane mapping of the signal structure constellation for double side band quadrature carrier modulation. All points are mapped in an N×N constellation having 90° symmetry about the origin. All points in excess of $2^M$ and any point appearing at origin are omitted. Any point, in each quadrant further spaced from the origin than any other point in that quadrant are relocated. "N" and "M" are integers.

5 Claims, 7 Drawing Figures

3×3 Constellation Decision Regions

3×3 Constellation Decision Regions

6×6 Constellation QAM
Decision Regions (Quadrant 1 only shown)

12000 bps.-Modified 6×6

14400 bps 8×8 Constellation
(Quadrant 1 only shown)

14400 bps. 8 × 8 Constellation (modification 1)

14400 bps. 8 × 8 Constellation (modification)

DOUBLE SIDE BAND-QUADRATURE CARRIER MODULATION SIGNAL STRUCTURES

BACKGROUND OF THE INVENTION

The present invention relates to high-speed data transmission and in particular to signal structures for double side band quadrature carrier (DSB-QC) modulation.

In U.S. Pat. No. 3,887,768 issued June 3, 1975 to Formey, Jr., et al for SIGNAL STRUCTURES FOR DOUBLE SIDE BAND QUADRATURE CARRIER MODULATION the inherent advantages of DSB-QC over single-sideband (SSB) and vestigial-sideband (VSB) are discussed in detail. Briefly, DSB-QC systems can be designed to have a much greater insensitivity to phase jitter on the line, or to phase error in the recovered carrier than SSB or VSB signals while permitting a coherent local demodulation carrier to be derived from the received data without requiring transmission of a carrier or pilot tone.

The previously mentioned U.S. Pat. No. 3,887,768 describes a DSB-QC modulation system in which the signal points are mapped in the complex plane on concentric rings the signal points of which are rotated by 45° from those of the next adjacent ring. While the disclosed DSB-QC constellations combat the combined effects of noise and phase jitter as discussed in the reference, in fact, improvements in the state-of-the art carrier equipment has itself contributed substantially to the reduction of phase jitter on many communication channels so that signal constellations designed to provide the best compromise performance between noise and phase jitter are no longer optimum in the sense of overall performance, wherein the "best" performance is defined as lowest overall bit error rate.

In order to attain higher data rates in a given bandwidth, higher signal-to-noise ratios in the communications media are required. As higher signal-to-noise ratios are required, constellations for more signal-to-noise efficient signals are necessary. In the presence of noise alone, signal constellations with points equally spaced on a square grid provide a near optimum performance. Moreover, such a pattern permits simple encoding at the transmitter and simple decoding or detection at the receiver. It is known that for a given error rate and bandwidth a square grid constellation offers better signal/noise performance than a comparable concentric ring type constellation. In fact, for example, a well known ring type constellation employing 16 points for 9600 bit transmission in a Nyquist bandwidth of 2400 Hz requires 1.3 dB greater signal/noise ratio for a given symbol error rate than a comparable square grid constellation. The well known concentric ring constellation discussed above is that proposed by CCITT Recommendation V.29 (offered commercially by Paradyne Corporation of Largo Florida as its MP-96 Data Modem). The square grid constellation is employed by Bell System in their model 209 Data Set.

The sacrifices paid for the greater signal to noise ratio of the square grid pattern over the concentric ring pattern are that:

1. The number of useable points must equal $2^M$ where M is an integer and thus M can only equal 2, 4, 8, 16 etc. As a result a grid such as 3×3 could not be used.

2. As the number of points increases the distance from the origin of the furthest point relative to the root mean square distance increases rapidly. Since the distance from the origin is proportioned to the voltage necessary to generate the point, the peak to average voltage ratio becomes large and may lead to clipping in most communication media.

In view of the above, it is the principal object of the present invention to provide improved DSB-QC signal structures developed to provide near optimum performance in the presence of noise.

A further object is to provide such signal structures which allow simple encoding and decoding or detection.

A still further object is to provide such signal structures wherein the points in each of the four quadrants may be differentially phase encoded such that an absolute carrier reference is not necessary.

Other objects and advantages will be self evident from the description of the preferred embodiments of my invention.

SUMMARY OF THE INVENTION

The above and other beneficial objects and advantages are attained in accordance with the present invention by providing double side band-quadrature carrier modulation signal structures wherein the constellations are composed of N×N points (N being an integer) having 90° symmetry in a modified square grid wherein for each quadrant all points which are at the origin or further spaced from the origin than any other point are relocated or omitted. Points are omitted if the square grid is composed of more than $2^M$ points (M being an integer) to reduce the number of points to $2^M$. Points that are relocated are brought closer to the origin and preferably to a location wherein the complexity of decoding is minimized (i.e., on an axis or on an extrapolated point on the grid).

DESCRIPTION OF PREFERRED EMBODIMENTS

Data rates heretofore employed for digital signalling over telephone channels may be expressed as $2400 \times 2^M$ where M is an integer. The standard rates attained therefore are 2400, 4800 and 9600 bits per second where M=0, 1, and 2 respectively. To conveniently attain these rates, modems which are switchable and therefore provide all rates usually signal at a symbol rate of 2400 symbols per second. Transmission at 2400 bps requires one bit to be encoded into one of two possible phases each symbol time. 4800 bps requires two bits to be encoded into one of four possible phases each symbol time and 9600 bps requires four bits to be encoded into sixteen points. The means for encoding and a method for implementing the encoding scheme are set forth in the previously mentioned U.S. Pat. No. 3,887,768.

Figure 1:
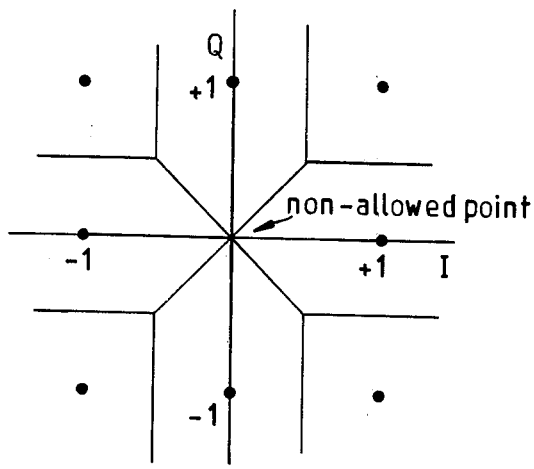
FIG. 1 depicts a 3×3 constellation which contains eight possible points.

In a modem providing 2400, 4800 and 9600 bps operation it is desirable to provide also the rate of 7200 bps particularly since certain terminals are designed to operate at 7200 bps. To obtain this rate, it is necesary to obtain 3 bits per symbol or eight possible points. In accordance with the present invention, the signal constellation of FIG. 1 provides this function as it allows three bits to be encoded into eight possible points. To obtain eight points on a square constellation the dimensions of the square must be at least 3×3 since anything less would not provide sufficient points. The set of points may be represented by the coordinates +1, 0, −1 on the in-phase and quadrature axes. In accordance with the present invention the zero point is eliminated thereby leaving the required eight points. Not allowing the zero point to occur has advantage of permitting continuous tracking of the carrier phase since reception of the 0,0 point does not convey carrier phase information. Since the 0,0 point has been eliminated no determination need be made as to whether or not the furthest point from 0,0 in each quadrant is further than all other points and no point relocating need be done.

The eight possible phases shown in FIG. 1 are differentially encoded such that an absolute carrier phase is not required.

Figure 2:
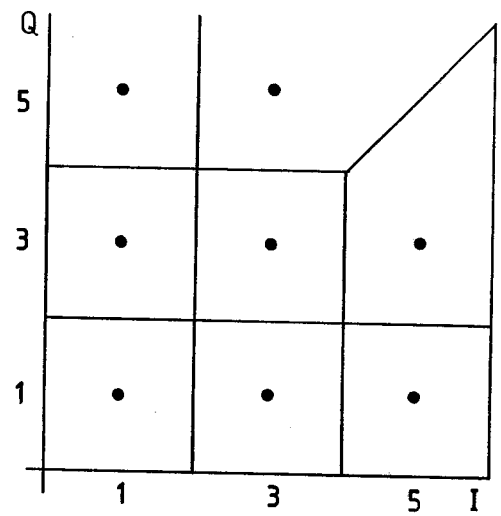
FIG. 2 depicts a 6×6 constellation which contains thirty-two possible points.

FIG. 2 illustrates one quadrant of a 6×6 constellation which can be used to yield a data rate of 12000 bits per second for a symbol rate of 2400 symbols per second. In this case each symbol is represented by 5 bits hence $2^M = 2^5 = 32$ and thus N×N must exceed 32. The lowest value for N is hence 6. Accordingly, 6 levels are allowed on each axis, but only 32 possibilities are permitted since for each symbol time five bits are encoded into a point. There are thus four non-allowed points which would occur at coordinates (−5, −5), (−5, 5), (5, −5) and (5, 5). Omitting these points minimizes the peak to average power level of the transmitted signal.

Figure 3:
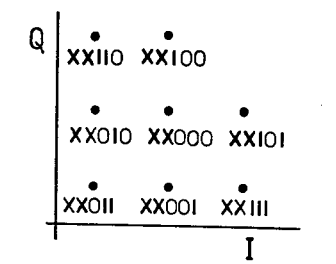
FIG. 3 depicts a possible encoding scheme for a 6×6 constellation.
Figure 4:
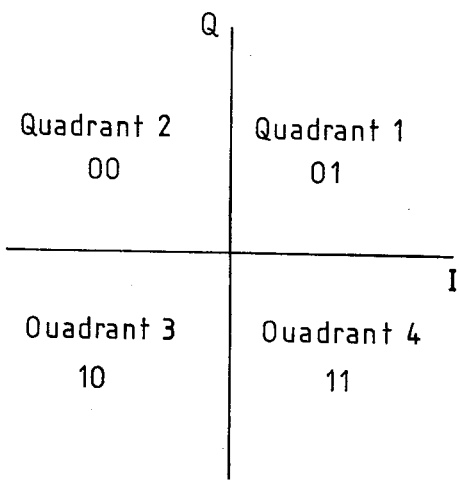
FIG. 4 illustrates differential gray coding of the quadrants to eliminate the need for a carrier phase reference.

FIG. 3 illustrates one candidate coding scheme for the constellation of FIG. 2 wherein the first two bits denoted by XX are differentially encoded between quadrants such that a carrier phase reference is not necessary. Differential coding of the first two bits between quadrants of the scheme of FIG. 3 to eliminate the requirement for a carrier phase reference is shown in FIG. 4.

Figure 5:
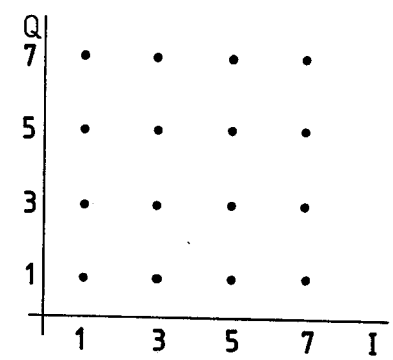
FIG. 5 depicts prior art related to a 8×8 constellation.
Figure 6:
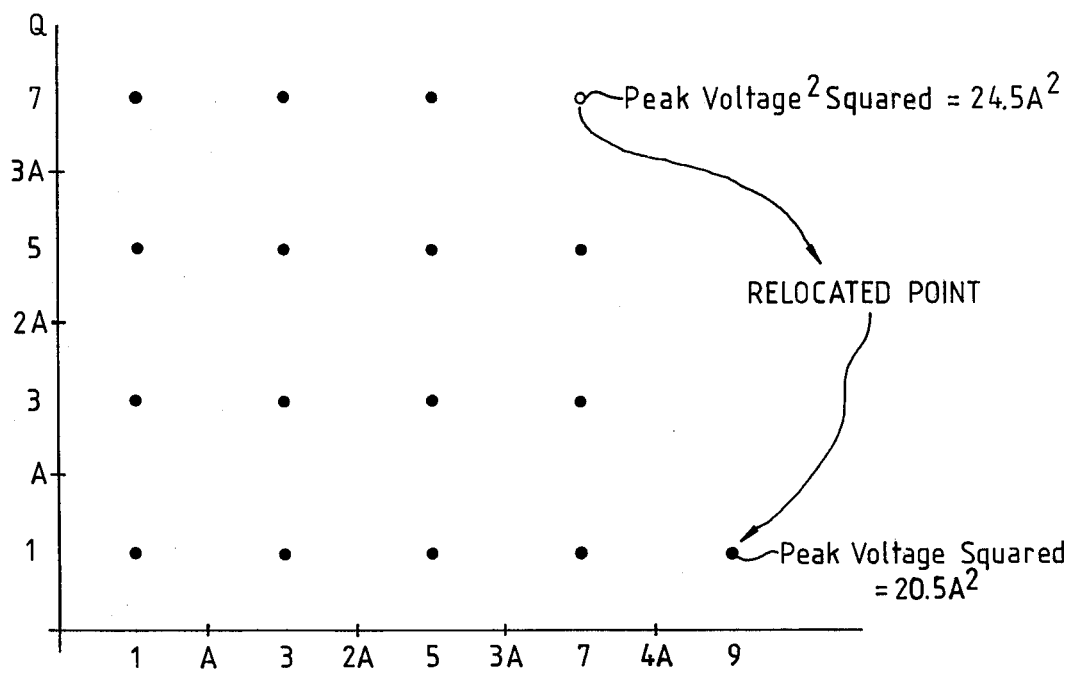
FIG. 6 depicts a modified 8×8 constellation.
Figure 7:
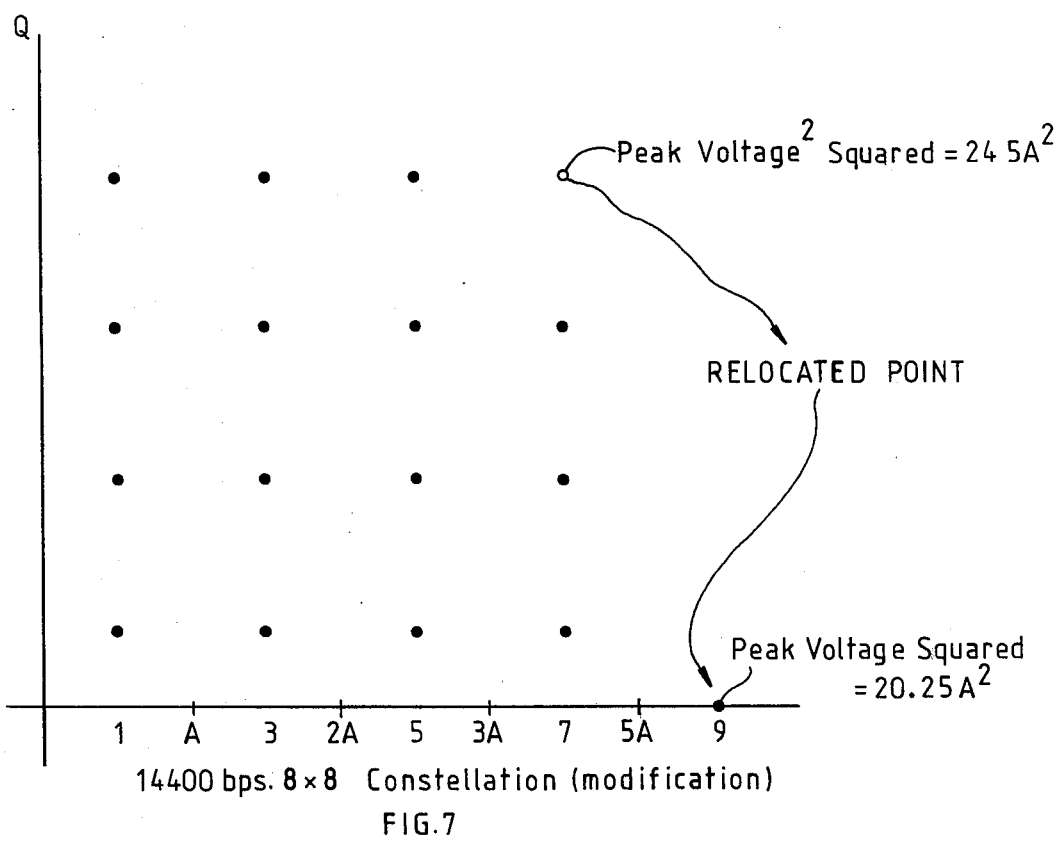
FIG. 7 depicts another modified 8×8 constellation.

To achieve a data rate of 14,400 bps at a symbol rate of 2400 symbols per second requires 6 bits to be encoded into one of sixty-four possible points each symbol time. This may be accomplished in accordance with the scheme of FIG. 5 which illustrates the prior art wherein all sixty-four points are spaced equally with respect to the in-phase and quadrature axes. However, the points located at coordinates (−7, −7), (−7, 7), (7, −7) and (7, 7) cause a relatively high peak to average power ratio because of their maximal distance from point 0, 0 (i.e., at the extreme points the power requirement is 24.5 $A^2$. Two modifications to the constellation of FIG. 5 in accordance with the present invention which yield a lower peak to average power ratio yet which preserve equal spacing on each axis and which provide symmetry in all four quadrants are illustrated in FIGS. 6 and 7. This is accomplished in each case by relocating the point in each quadrant further spaced from the origin than any other point (i.e., 7.7; −7,7; 7, −7 and −7, −7) to positions closer to the origin.

In FIG. 6, the point at (7, 7) is relocated to (9, 1). Similarly, the point at (−7, 7) is relocated to (−1, 9). (−7, −7) is relocated to (−9, −1) and (7, −7) is relocated to (1, −9).

In FIG. 7, the point at (7, 7) is relocated to (9, 0). Similarly, the point at (−7, 7) is relocated to (0, 9). (−7, −7) is relocated to (−9, 0) and (7, −7) is relocated to (0, −9).

In each case the danger of the signal being clipped is significantly reduced since the peak power requirement is reduced by 0.8 dB as indicated in FIGS. 6 and 7.

What is claimed is:

1. A method for mapping in the complex plane the point constellation of a double side band-quadrature carrier modulation system wherein each symbol conveys M bits (M being an integer) of information comprising the steps of:
    a. Mapping the points in a constellation composed of N×N points (N being an integer) having 90° symmetry about the origin;
    b. Omitting any point appearing at the origin;
    c. Omitting any points in excess of $2^M$; and
    d. Relocating the point in each quadrant further spaced from the origin than any other point to a point closer to the origin than it previously occupied.

2. The method in accordance with claim 1 wherein M=3, N=3, the points are arranged along −1, 0 and +1 along each axis and the origin point (0, 0) is omitted.

3. The method in accordance with claim 1 wherein M=5, N=6, the points are arranged on −5, −3, −1, 1, 3 and 5 along each axis, and the points at 5, 5; −5, 5; 5, −5; and −5, −5 are omitted.

4. The method in accordance with claim 1 wherein M=6, N=8; the points are arranged at −7, −5, −3, −1, 1, 3, 5 and 7 along each axis, and the points located at (7, 7) (−7, 7) (7, −7) and (−7, −7) are relocated to (9, 1), (−1, 9), (1, −9) and (−9, −1) respectively.

5. The method in accordance with claim 1 wherein M=6, N=8, the points are arranged at −7, −5, −3, −1, 1, 3, 5 and 7 along each axis and the points located at (7, 7), (−7, 7), (7, −7) and (−7, −7) are relocated to (9, 0), (0, 9), (0, −9) and (−9, 0) respectively.

* * * * *